United States Patent
Naghi et al.

(12)

(10) Patent No.: US 6,520,501 B1
(45) Date of Patent: Feb. 18, 2003

(54) METHOD FOR USING A PORTABLE HANDHELD VIDEO GAME DEVICE WITH A SEPARATE OUTPUT DISPLAY

(75) Inventors: Herschel Naghi, Los Angeles, CA (US); Craig Erickson, Hollywood Hills, CA (US)

(73) Assignee: Nyko Technologies, Inc., Los Angeles, CA (US)

( * ) Notice: Subject to any disclaimer, the term of this patent is extended or adjusted under 35 U.S.C. 154(b) by 0 days.

(21) Appl. No.: 09/938,709

(22) Filed: Aug. 23, 2001

(51) Int. Cl.[7] .................................................. A63F 13/00
(52) U.S. Cl. ...................................... 273/148 B; 463/47
(58) Field of Search ................... 273/148 B, 236, 273/237, 238, 260; 463/34, 40, 42, 47; 700/91

(56) References Cited

U.S. PATENT DOCUMENTS

| | | | |
|---|---|---|---|
| 4,976,429 A | * 12/1990 | Nagel | ......................... 345/157 |
| 5,393,072 A | * 2/1995 | Best | ............................... 463/1 |
| 5,678,571 A | * 10/1997 | Brown | ........................ 128/898 |
| 5,857,912 A | * 1/1999 | Freitag et al. | .............. 273/371 |

* cited by examiner

Primary Examiner—Raleigh W. Chiu
(74) Attorney, Agent, or Firm—Procopio, Cory, Hargreaves & Savitch, LLP

(57) ABSTRACT

A method of using a portable handheld video game device with a separate output display includes providing a communication apparatus for a handheld portable video game device including a display; connecting the communication apparatus to the handheld portable video game device and the separate output display; imaging the display of the handheld portable video game device with the communication apparatus to produce an imaged display of the handheld portable video game device; and displaying the imaged display of the handheld portable video game device on the separate output display.

9 Claims, 2 Drawing Sheets

METHOD FOR USING A PORTABLE HANDHELD VIDEO GAME DEVICE WITH A SEPARATE OUTPUT DISPLAY

FIELD OF THE INVENTION

The present invention is in the field of accessories for use with portable handheld video game devices.

BACKGROUND OF THE INVENTION

Hand-held, portable, battery-powered video game devices have become very common and quite popular. Well-known examples of such devices are the GAME BOY®, GAME BOY COLOR® and GAME BOY ADVANCE™ devices sold by Nintendo®.

The viewing screen for portable, handheld, battery-powered video game devices is inherently small due to the portable nature of the device. The tiny viewing screen is generally acceptable when the user is taking advantage of the portable nature of the device such as playing with the device in the car, on the road, at the playground, at the park, etc.; however, the inventors of the present invention have recognized that when a television, monitor, or similar large viewing mechanism is available (e.g., when using the device at home or at a house of a friend or relative), it would be desirable to allow the device to communicate with the large viewing mechanism for displaying the video game action from the device on the viewing mechanism so that the user can take advantage of the larger screen of the viewing mechanism for more enjoyable gaming versus the tiny screen of the portable, handheld video game device.

SUMMARY OF THE INVENTION

Accordingly, an aspect of the invention involves a method of using a portable handheld video game device with a separate output display. The method includes providing a communication apparatus for a handheld portable video game device including a display; connecting the communication apparatus to the handheld portable video game device and the separate output display; imaging the display of the handheld portable video game device with the communication apparatus to produce an imaged display of the handheld portable video game device; and displaying the imaged display of the handheld portable video game device on the separate output display.

These and further objects and advantages will be apparent to those skilled in the art in connection with the drawing and the detailed description of the preferred embodiment set forth below.

DETAILED DESCRIPTION OF THE PREFERRED EMBODIMENT

Figure 2:
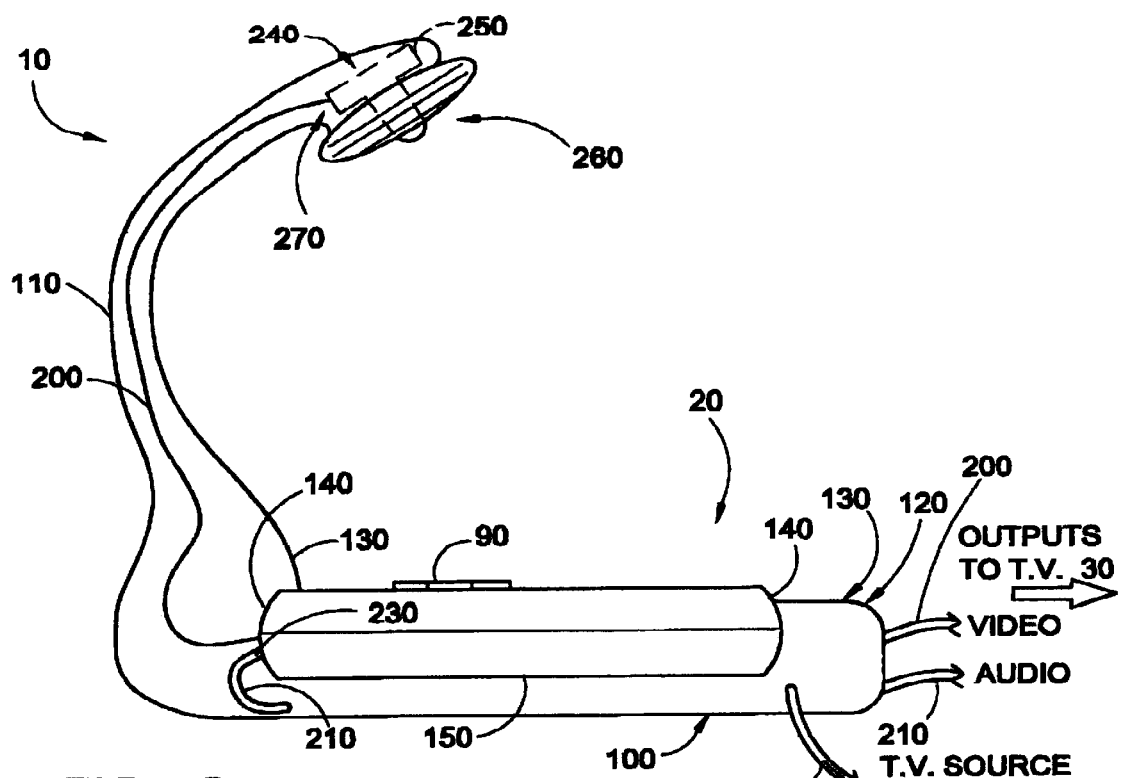
FIG. 2 is a side-elevational view of the visual communication apparatus.
Figure 1:
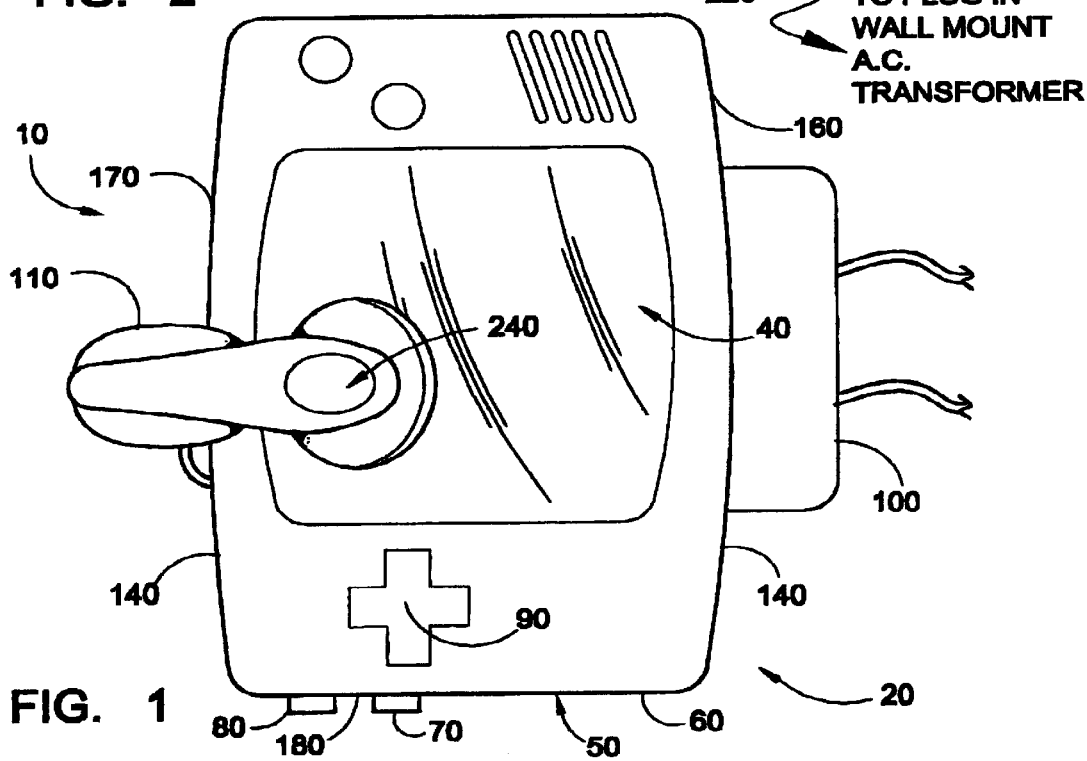
FIG. 1 is a top plan view of an embodiment of a visual communication apparatus for a handheld portable video game device.

With reference to FIGS. 1 and 2, an embodiment of audio-visual communication apparatus 10 for a handheld portable video game device 20 is shown. The apparatus 10 may be used to communicate the device 20 with a larger separate display 30 (compared to a small display or viewing screen 40 of the device 20) for displaying the video game action being played on the device 20 on the larger display 30. The larger separate display 30 will be described herein as a TV; however, other separate displays 30 may be used with the apparatus 10 other than a TV such as, but not by way of limitation, a computer monitor, a video monitor, and a projector. Further, although the apparatus 10 will be described as communicating audio and video signals to the TV 30, in an alternative embodiment, the apparatus 10 may communicate only video signals to the TV 30. Examples of handheld portable video game devices that the apparatus 10 may be used with include, but not by way of limitation, the GAME BOY®, GAME BOY COLOR® and GAME BOY ADVANCE™ devices sold by Nintendo®. It should be noted, handheld portable video game devices are distinguishable from video game console systems such as, but not by way of limitation, Nintendo 64®, Sega Dreamcast, and Sony Playstation®. Handheld portable video game devices are generally distinguishable from video game console systems in that handheld portable video game devices generally include all their components in a self-contained, small, easily portable, handheld unit (i.e., display, sound system, and keypad(s) are self-contained and integrated into the handheld unit) and are designed to be powered by disposable and/or rechargeable batteries.

In the embodiment shown in FIGS. 1 and 2, the device 20 has the small display or viewing screen 40 in a body housing 50, a power port 60, an audio port 70, a utility/communication port 80, and keypads 90. Although not shown, the device 20 may accommodate one or more batteries to power the device 20. The batteries may be disposable and/or rechargeable. Further, it is anticipated that in the future, the device 20 may be powered by other types of portable power sources (e.g., solar-powered, fuel cells). The display 40 shown is a non-backlit or insufficiently backlit color LCD display. However, in alternative embodiments, the display 40 may be black and white (e.g., Nintendo GameBoy®), the display 40 may be backlit or sufficiently backlit, and/or the display 40 may be a display other than an LCD display. The power port 60 is a DC power port that is configured to receive a plug of an AC adapter for plug-in capability to a non-portable power source, such as a AC wall outlet. The audio port 70 is configured to receive a plug of a pair of headphones for outputting sound signals from the device 20 to the headphones. The utility/communication port 80 is configured to receive a plug of a communication cable for communicating with another device 20 for head-to-head gaming competition. The keypads 90 function as input keys for controlling the device 20 and operating the video game. Although not shown, the device 20 preferably includes a receiving slot for slidably receiving a video game cartridge that holds one or more video games to played on the device 20.

An embodiment of apparatus 10 will now be described in detail. The apparatus 10 includes connectable housing 100 and one or more bodies 110 extending from the housing 100. The connectable housing 100 may include one or more mounting members 120 for mounting the apparatus 10 to the device 20. The connectable housing 100 may have a pair of opposite mounting members 130 for mounting the apparatus 10 at opposite ends 140 and an along a back side 150 of the device 20. Although the mounting members 130 shown are configured to attach to top and bottom ends 160, 170 of the device 20, in alternative embodiments, the mounting members 130 may attach to left and right ends 180,190, or one or more mounting members 130 may be configured to attach to one or more ends 140 of the device 20. Further, as described below, in the alternative, or additionally, the apparatus 10 may include one or more plugs for plugging into one or more of the power port 60, audio port 70, and utility/communication port 80 and this plug-in connection may serve to secure the apparatus 10 to the device 20. The mounting members 130 may be generally C-shaped for clamping onto one or more ends 140 of the device 20.

As shown in FIG. 2, a video output line 200 and an audio output line 210 may extend from the apparatus 10. The lines 200,210 may plug into respective ports of the apparatus 10 or may extend from the apparatus 10. The lines 200, 210 preferably include plugs at opposite ends of the lines 200, 210 for plugging into the input audio and video connectors of the TV 30. A power line 220 may extend from the apparatus 10. The power line 220 may plug into a port of the apparatus 10 or may extend from the apparatus 10. The power line 220 may include an AC adapter for converting AC power from a wall outlet to DC power for delivery to the apparatus 10. If the apparatus 10 includes a power port for connecting the power line 220, the same AC adapter and line used to power the device 20 may be used to power the apparatus 10. Further, in an alternative embodiment, the apparatus 10 may obtain power via the device 20 and the device 20 may be powered via an AC adapter and/or from a portable power source (e.g. batteries). The apparatus 10 may include a plug connected to the power line 220 that plugs into the power port 60 of the device 20 for powering the device 20 as well as the apparatus 10. The apparatus 10 may include a plug 230 (e.g., ⅛ in. mini phone jack) connected to the audio line 210 that plugs into the audio port 70 of the device 20 for communicating the audio line 210 (and, hence, the audio of the TV 30) with the audio of the device 20.

The apparatus 10 may include an imaging mechanism 240 in a head 250 of one of the one or more bodies 110. An embodiment of the imaging mechanism 240 may include an adjustable macro lens 260 and an imager 270. The lens 260 is preferably a color CMOS imager lens. The lens 260 is preferably rotatably coupled to the head 250 of the body 110 to allow the user to rotatably focus the lens 260. The imager 270 is preferably a single-chip CMOS image sensor otherwise known as a camera on a single chip (e.g., OV 70910/7410/7411) sold by OmniVision Technologies, Inc. of Sunnyvale, Calif. or the equivalent. The imager 270 is connected to the video line 200 for communicating video signals from the imager 270 to the TV 30 for display of the video game played on the device 20 on the TV 30.

Figure 3:
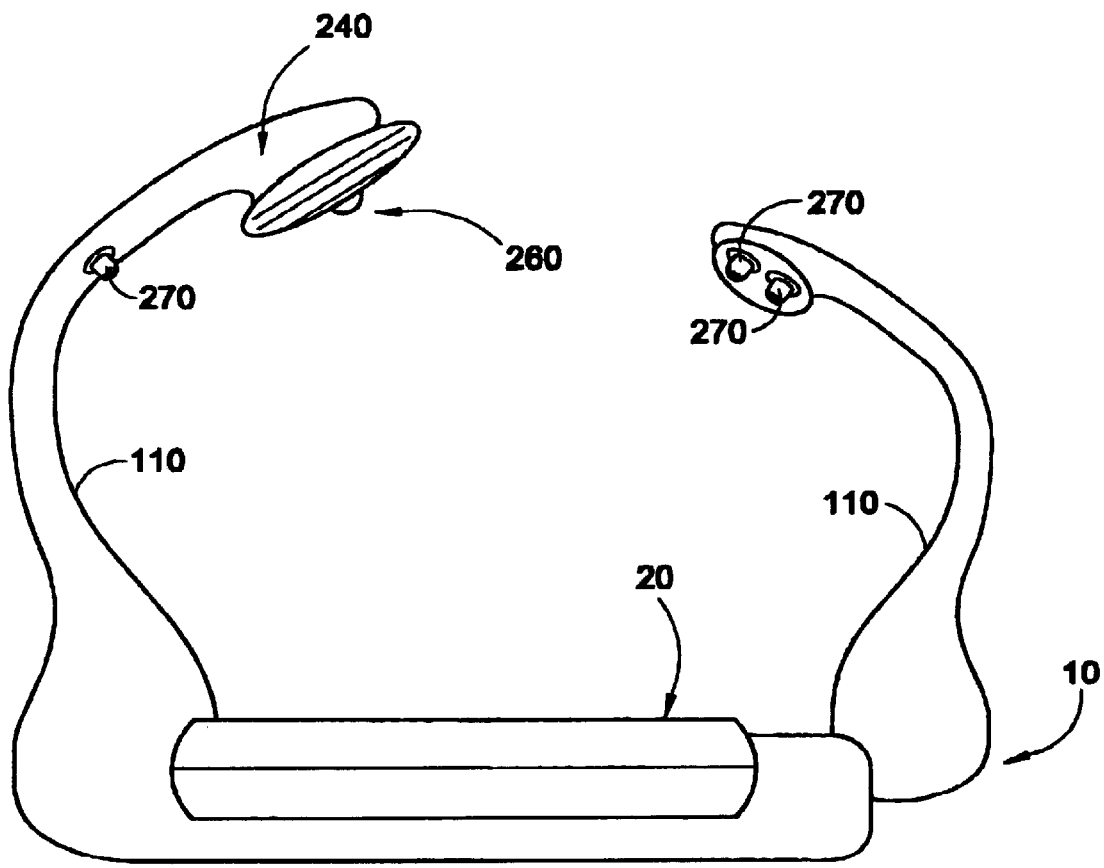
FIG. 3 is a side-elevational view of an alternative embodiment of a visual communication apparatus

With reference to FIG. 3, the apparatus 10 may include one or more illumination sources 270 on one or more bodies 110 for illuminating the display 40 of the device 20 so that sufficient light is provided for obtaining images of the display 40. The one or more illumination sources 270 may include one or more LEDs (preferably white LEDs), incandescent bulbs, or other illumination sources. Preferably, the one or more illumination sources 270 include one or more white LEDs, especially if the one or more illumination sources 270 are powered by a portable power source (e.g., one or more batteries). In an exemplary alternative embodiment, the apparatus 10 may include a pair of bodies 110, each carrying a pair of illumination sources 270. Each of the four illumination sources 270 may illuminate a different quadrant of the display 40.

The apparatus 10 will now be described in use. The apparatus 10 is clipped onto or connected onto the device 10 by clipping the one or more connection members 110 over the ends 140. The apparatus 10 is preferably oriented as shown in FIG. 2 so that the imaging mechanism 240 has the same orientation as that of a normal user's eyes looking at the display 40, i.e., the imaging mechanism 240 imaging the display 40 from or near a user end or bottom end 170 of the device 20. The power line 220 may be plugged into an AC outlet to power the imaging mechanism 240. If the power line 220 is separate from the apparatus 10, the power line 220 may also have to be plugged into the apparatus 10. In an alternative embodiment, where the portable power supply (e.g., one or more batteries) powers the apparatus 10, the apparatus 10 may be plugged into the device 20 (e.g., through the utility/communication port 80) for powering the apparatus 10. The video and audio output lines 200,210 are plugged into the video and audio input connectors of the TV 30. Alternatively, if the display 30 does not include audio capability, only the video line 200 may be plugged into a video connector of the display 30 (or the apparatus 10 may not include an audio line 210 in such a case). If the video and audio output lines 200, 210 are separate from the apparatus 10, the video and audio output lines 200, 210 may also have to be plugged into the apparatus 10. The plug 230 (e.g., ⅛ in. mini phone jack), which is connected to the audio line 210, is plugged into the audio port 70 of the device 20 for communicating the 20 audio line 210 (and, hence, the audio of the TV 30) with the audio of the device 20. The apparatus 10 may include an on/off switch for actuating/deactivating the apparatus 10. The switch may be turned on to activate the apparatus 10. When activated, the imaging mechanism 240 takes the output of the display 40 and converts the color LCD to a high-quality NTSC or PAL video output for displaying the play screen onto the TV 30 (filling the entire or substantially the entire screen of the TV 30) to give the user a greater immersion into the game graphics (i.e., better quality graphics). One or more illumination sources 270 may be illuminated when the apparatus 10 is turned on for greater illumination of the display 40 for improved imaging. If the image displayed the TV 30 is out of focus, the lens 260 may be rotated to adjust the focus. Further, the one or more bodies 110 may be adjustable for adjusting the orientation of the imaging mechanism 240 and/or the one or more illumination sources for optimal imaging of the display 40. This may include adjusting the orientation of the one or more bodies 110 so that the one or more bodies 110 are not imaged as part of a reflection off of the display 40. The one or more bodies 110 may also come pre-configured at a desired orientation and/or angle so that when the apparatus 10 is used with the device 20, the one or more bodies 110 are not imaged as part of a reflection off of the display 40. Audio is fed from the plug 230 through to audio line 210 to the TV sound input for video game sound output from the TV 30 (i.e., better quality sound).

Thus, the apparatus 10 allows a user to use a separate TV 30 for playing a video game with the device. Using a separate TV 30 with a larger screen to display the game graphics and provide improved sound enhances the handheld video game experience.

It will be readily apparent to those skilled in the art that still further changes and modifications in the actual concepts described herein can readily be made without departing from the spirit and scope of the invention as defined by the following claims.

What is claimed is:

1. A method of using a portable handheld video game device with a separate output display, comprising:

providing a communication apparatus for a handheld portable video game device including a display;

connecting the communication apparatus to the handheld portable video game device and the separate output display;

imaging the display of the handheld portable video game device with the communication apparatus to produce an imaged display of the handheld portable video game device;

displaying the imaged display of the handheld portable video game device on the separate output display.

2. The method of claim 1, wherein the separate output display is a television.

3. The method of claim 1, wherein the handheld portable video game device includes audio output and the separate output display includes audio input and output, and the method further includes connecting the audio output of the handheld portable video game device to the audio input of the separate output display and outputting audio of the handheld portable video game device with the audio input of the separate output display.

4. The method of claim 1, wherein the communication apparatus includes an imaging mechanism with an adjustable lens, and the method further includes adjusting the lens to adjust focus of the imaged display of the handheld portable video game device.

5. The method of claim 4, wherein the adjustable lens is rotatable.

6. The method of claim 1, wherein the communication apparatus includes an imaging mechanism adapted to be located on a user side of the handheld portable video game device when the apparatus is connected to the handheld portable video game device.

7. The method of claim 1, wherein the communication apparatus includes an adjustable body and an imaging mechanism carried by the adjustable body.

8. The method of claim 1, wherein the communication apparatus includes an imaging mechanism and one or more illumination sources to illuminate the display of the handheld portable video game device.

9. The method of claim 1, wherein the communication apparatus includes an imaging mechanism having a color CMOS imager lens and a single-chip CMOS image sensor.

* * * * *